United States Patent Office 2,957,906
Patented Oct. 25, 1960

2,957,906

KETONES

Floyd B. Erickson and Erhard J. Prill, Dayton, Ohio, assignors to Monsanto Chemical Company, St. Louis, Mo., a corporation of Delaware No Drawing. Filed Oct. 25, 1955, Ser. No. 542,789

2 Claims. (Cl. 260—468)

This invention relates to novel ketones containing bicyclic ring structures and to a method of obtaining the same.

The present ketones are prepared by reacting an aldehyde with a bicyclic olefin under free radical liberating conditions, in accordance with the equation:

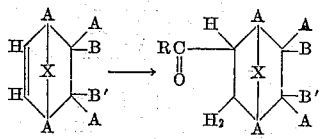

where R is a hydrocarbon radical free of non-benzenoid unsaturation, of from 1 to 20 carbon atoms, X is selected from the class of divalent radicals consisting of oxygen and saturated alkylene radicals of from 1 to 3 carbon atoms, A is selected from the class consisting of hydrogen and hydrocarbon radicals free of non-benzenoid unsaturation of from 1 to 10 carbon atoms, and B and B' taken separately are selected from the class consisting of hydrogen, hyrocarbon radicals free of non-benzenoid unsaturation of from 1 to 10 carbon atoms, and substituents (1) containing at least one of an atom selected from the class consisting of oxygen, nitrogen, and halogen atoms, (2) containing less than 11 carbon atoms, and (3) free of non-benzenoid unsaturation; provided that at least one of B and B' is not hydrogen, while B and B' taken together represent a dicarboxylic anhydride group. (It is to be noted that by bicyclic olefinic compounds here are also meant tricyclic compounds in which the third ring structure is formed by an acid anhydride group.) The term, "non-benzenoid unsaturation" is used herein to mean carbon-to-carbon olefinic and acetylenic unsaturation.

Aldehydes which may be employed in the preparation of the present ketones are aldehydes which contain from 1 to 20 carbon atoms, and which are free of non-benzenoid unsaturation, such as aralkyl aldehydes, e.g., phenylacetaldehyde, phenylmethylacetaldehyde, diphenylacetaldehyde, etc.; cycloalkyl aldehydes such as cyclohexanecarboxaldehyde; aryl aldehydes such as benzaldehyde; alkaryl aldehydes such as p-tolualdehyde, etc. Particularly preferred in the process of the present invention are alkyl aldehydes such as acetaldehyde, propionaldehyde, butyraldehyde, valeraldehyde, caproaldehyde, enanthaldehyde, capryaldehyde, pelargonaldehyde, capraldehyde, hendecanoaldehyde, lauraldehyde, myristaldehyde, palmitaldehyde, stearaldehyde, etc. Mixed aldehydes, such as those which are available commercially, are also useful in the present process.

The bicyclic olefins which are of the above formula and useful in the present process are those in which at least one substituent, as further herein specified, is present on one of the ethylene $$-\overset{\gamma}{\text{C}}-\overset{\gamma}{\text{C}}-$$

bridge carbon atoms. (It may be noted that the choice of the chain illustrated as the central bridge is arbitrary, i.e., the following two formulas are equivalents:

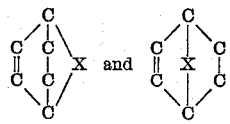

where X represents a divalent ethylene radical, two ethylene bridges are present in the bicyclic olefin.) Bicyclic olefinic compounds useful in the present process and of the requisite structure:

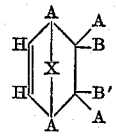

where A, B, B' and X are defined above, are available particularly readily by way of the well-known Diels-Alder synthesis. Diels-Alder adducts are prepared by reacting a diene with an unsaturated compound designated in the art of Diels-Alder syntheses as a dienophile. In the preparation of bicyclic compounds by the Diels-Alder synthesis, the diene employed as a starting material is usually a cyclic compound, such as cyclopentadiene, cyclohexadiene, furan, 1,4-dimethyl-1,3-cyclopentadiene, 1,5,5-trimethyl-1,3-cyclopentadiene, 2-methylfuran, 2,5-dimethylfuran, etc., cyclopentadiene being particularly preferred because of its availability and low cost. The dienophiles reactive with these dienes, as is well-known in the art, include a large number of compounds containing an olefinic group conjugated with one or more carbonyl (carboxylic acid, carboxylic acid ester, acid anhydride, aldehyde and acyl) or other unsaturated groups such as cyano groups or nitro groups, and also a number of vinyl compounds and allyl compounds such as vinyl hydrocarbons, e.g., styrene; vinyl and allyl halides; allyl alcohol; allylamine; allyl isothiocyanate; vinyl ethers and thioethers, etc.

Examples of presently useful bicyclic olefinic compounds in which the substituent on one of the ethylene bridge carbon atoms is a hydrocarbon radical and which are available by a Diels-Alder synthesis are, for example:

5-phenylbicyclo[2.2.1]-2-heptene,
5-p-tolylbicyclo[2.2.1]-2-heptene,
5-m-tolylbicyclo[2.2.1]-2-heptene,
5-o-tolylbicyclo[2.2.1]-2-heptene,
5-phenyl-7-oxabicyclo[2.2.1]-2-heptene,
5-p-tolyl-7-oxabicyclo[2.2.1]-2-heptene,
5-phenylbicyclo[2.2.2]-2-octene,
1,7,7-trimethyl-5-phenylbicyclo[2.2.1]-2-heptene,
1-methyl-5-phenyl-7-oxabicyclo[2.2.1]-2-heptene,
1,4-dimethyl-5-phenyl-7-oxabicyclo[2.2.1]-2-heptene, etc.

As other examples of bicyclic compounds containing a single olefinic, —CH=CH—, bridge in the ring system and bearing substituents on the ethylene, $$-\overset{\gamma}{\text{C}}-\overset{\gamma}{\text{C}}-$$

bridge, which may be reacted with aldehydes by the present process to give the novel ketones of this invention, may be listed products of the reaction of various dienes with maleic anhydride, for example:

bicyclo[2.2.1]-5-heptene-2,3-dicarboxylic anhydride,
7-oxabicyclo[2.2.1]-5-heptene-2,3-dicarboxylic anhydride,
bicyclo[2.2.2]-5-octene-2,3-dicarboxylis anhydride,
1,4-dimethylbicyclo[2.2.1]-5-heptene-2,3-dicarboxylic anhydride,
1,7,7-trimethylbicyclo[2.2.1]-5-heptene-2,3 - dicarboxylic anhydride, 1-methyl-7-oxabicyclo[2.2.1]-5-heptene-2,3 - dicarboxylic anhydride, etc.

By hydrolysis and esterification of Diels-Alder adducts of maleic anhydride with cyclic dienes, or alternatively, by reaction of a di-ester of maleic anhydride with a cyclic diene, bicyclic alkenedicarboxylate esters may be obtained which are similarly useful in the present process for producing novel ketones. Examples of such esters are, for example:

dimethyl bicyclo[2.2.1]-5-heptene-2,3-dicarboxylate,
diisopropyl bicyclo[2.2.1]-5-heptene-2,3-dicarboxylate,
bis(2-ethylhexyl) bicyclo[2.2.1]-5-heptene-2,3-dicarboxylate,
di-n-butyl 7-oxabicyclo[2.2.1]-5-heptene-2,3-dicarboxylate,
diamyl 1-octylbicyclo[2.2.1]-5-heptene-2,3-dicarboxylate,
dimethyl 1,7,7-trimethylbicyclo[2.2.1]-5-heptene-2,3-dicarboxylate,
diisobutyl bicyclo[2.2.2]-5-octene-2,3-dicarboxylate.

Bicyclic olefinic compounds derivable from α,β-unsaturated monocarboxylic acids such as acrylic acid, crotonic acid, etc., and esters thereof, by a Diels-Alder reaction with a cyclic diene, which are useful for producing the present novel ketones, include, for example:

bicyclo[2.2.1]-5-heptene-2-carboxylic acid,
3-phenylbicyclo[2.2.1]-5-heptene-2-carboxylic acid,
methyl bicyclo[2.2.1]-5-heptene-2-carboxylate,
amyl 3-phenylbicyclo[2.2.1]-5-heptene-2-carboxylate,
2 - ethylhexyl 1,4 - dimethylbicyclo[2.2.1] - 5 - heptene-2 - carboxylate,
ethyl bicyclo[2.2.2]-5-octene-2-carboxylate,
7-oxabicyclo[2.2.1]-5-heptene-2-carboxylic acid,
isopropyl 1 - methyl - 7 - oxabicyclo[2.2.1] - 5 - heptene-2 - carboxylate, etc.

Vinyl esters of fatty acids form Diels-Alder adducts with cyclic dienes such as cyclopentadiene, furan, etc., which may be used as starting materials in the process of the invention. As examples of this type of bicyclic olefinic compound may be listed, for example:

bicyclo[2.2.1]-5-hepten-2-yl acetate,
bicyclo[2.2.2]-5-octen-2-yl acetate,
7-oxabicyclo[2.2.1]-5-hepten-2-yl acetate,
1-methyl-7-oxabicyclo[2.2.1]-5-hepten-2-yl acetate,
1-phenyl-7-oxabicyclo[2.2.1]-5-hepten-2-yl acetate,
1,7,7-trimethylbicyclo[2.2.1]-5-hepten-2-yl acetate,
1,4-dimethylbicyclo[2.2.1]-5-hepten-2-yl acetate,
1,4-di-n-butylbicyclo[2.2.1]-5-hepten-2-yl acetate,
1-n-hexylbicyclo[2.2.1]-5-hepten-2-yl acetate,
bicyclo[2.2.1]-5-hepten-2-yl propionate,
bicyclo[2.2.1]-5-hepten-2-yl butyrate,
bicyclo[2.2.1]-5-hepten-2-yl isododecanoate,
7-oxabicyclo[2.2.1]-5-hepten-2-yl propionate,
bicyclo[2.2.2]-5-octen-2-yl isobutyrate.

Bicyclic olefinic compounds useful in the present process which are available by a Diels-Alder synthesis from cyclic dienes and a vinyl ketone, e.g., phenyl vinyl ketone, include:

bicyclo[2.2.1]-5-hepten-2-yl phenyl ketone,
bicyclo[2.2.1]-5-hepten-2-yl methyl ketone,
bicyclo[2.2.2]-5-octen-2-yl methyl ketone,
3-benzoylbicyclo[2.2.1]-5-hepten-2-yl phenyl ketone,
3-benzoyl-7-oxabicyclo[2.2.1]-5-hepten-2-yl phenyl ketone,
3-p-toluoylbicyclo[2.2.1]-5-hepten-2-yl p-tolyl ketone,
3 - (2,4,6 - trimethylbenzoyl)bicyclo[2.2.1] - 5 - hepten-2-yl mesityl ketone,
1,4-dimethylbicyclo[2.2.1]-5-hepten-2-yl methyl ketone, etc.

Carbonitrile-substituted bicyclic olefinic compounds are also useful in the process of the invention. As examples of such compounds which may be prepared, e.g., by reaction of α,β-unsaturated nitriles such as acrylonitrile with cyclic dienes, may be recited:

bicyclo[2.2.1]-5-heptene-2-carbonitrile,
7-oxabicyclo[2.2.1]-5-heptene-2-carbonitrile,
bicyclo[2.2.2]-5-octene-2-carbonitrile,
1-methyl-7-oxabicyclo[2.2.1]-5-heptene-2-carbonitrile,
1,4-dimethyl-7-oxabicyclo[2.2.1]-5-heptene-2-carbonitrile,
1,7,7-trimethylbicyclo[2.2.1]-5-heptene-2-carbonitrile,
3-methylbicyclo[2.2.1]-5-heptene-2-carbonitrile,
3-methyl-7-oxabicyclo[2.2.1]-5-heptene-2-carbonitrile,
3-methylbicyclo[2.2.2]-5-octene-2-carbonitrile,
1,3,4-trimethylbicyclo[2.2.1]-5-heptene-2-carbonitrile,
1,3,4 - trimethyl - 7 - oxabicyclo[2.2.1] - 5 - heptene - 2 - carbonitrile, etc.

When α,β-unsaturated nitro compounds, such as 1-nitro-1-propylene, β-nitrostyrene, etc., are utilized as the dienophile in a Diels-Alder synthesis with cyclic dienes, bicyclic olefinic compounds which may be prepared and which form useful starting materials for the synthesis of the invention, include, e.g., 5-methyl-6-nitrobicyclo[2.2.1]-2-heptene,
5-methyl-6-nitro-7-oxabicyclo[2.2.1]-2-heptene,
5-methyl-6-nitrobicyclo[2.2.2]-2-octene,
5-nitro-6-propylbicyclo[2.2.1]-2-heptene,
5-nitrobicyclo[2.2.1]-2-heptene,
5-nitro-6-phenylbicyclo[2.2.1]-2-heptene,
5-nitro-6-phenylbicyclo[2.2.2]-2-octene, etc.

In addition to the above compounds containing a functional group including an unsaturated bond, i.e., carbonyl or cyano, etc., bicyclic olefinic compounds which have other functional groups containing oxygen, nitrogen, or halogen, attached to one ethylene bridge carbon atom, may be used in the present process. Examples of such bicyclic olefins which may be prepared from vinyl halides and cyclic dienes are, e.g., 5-chlorobicyclo[2.2.1]-2-heptene,
5-bromobicyclo[2.2.1]-2-heptene,
5-chlorobicyclo[2.2.2]-2-octene,
5-chloro-1,4-dimethylbicyclo[2.2.1]-2-heptene,
5-chloro-1,7,7-trimethylbicyclo[2.2.1]-2-heptene,
5,5,6-trichlorobicyclo[2.2.1]-2-heptene, etc.

From vinyl ethers and thioethers, such useful bicyclic olefinic compounds may be obtained as starting materials for the present process as bicyclo[2.2.1]-5-hepten-2-yl ethyl ether,
bicyclo[2.2.1]-5-hepten-2-yl butyl ether,
bicyclo[2.2.1]-5-hepten-2-yl phenyl ether,
bicyclo[2.2.2]-5-octen-2-yl butyl ether,
bicyclo[2.2.1]-5-hepten-2-yl p-toyl sulfide, etc.

Similarly, allyl compounds, e.g., allyl halides, may be combined with cyclic dienes to give useful bicyclic olefinic compounds for further reaction in accordance with the present process, e.g., 5-chloromethylbicyclo[2.2.1]-2-heptene, 5-chloromethylbicyclo[2.2.2]-2-octene,
5-bromomethyl-7-oxabicyclo[2.2.1]-2-heptene, etc.

The above description has listed a number of presently useful bicyclic compounds in which the substituents on the ethylene bridges are exemplary of groups containing (1) halogen, e.g., chloro; (2) nitrogen, e.g., cyano and nitro; and (3) oxygen, e.g., carbonylic oxygen in ketones, aldehydes, and carboxylic acids and derivatives thereof, and the oxygen of ethers and alcohols. Other radicals containing at least one of these elements, such as alkyl isocyanate, N-alkyl alkylcarboximide, dicarboximide, etc., are equally acceptable as substituents on the specified bridge of the presently useful bicyclo-olefins, the utility of the processing in producing new ketones being limited only by the availability of olefinic bicyclic compounds of the requisite structure.

Instead of the Diels-Alder synthesis, other synthetic methods may, of course, be used to prepare the starting materials for the present process, and it is immaterial how the components employed in our present process are prepared, so long as they have the necessary structure. Mixtures of bicyclic olefinic compounds may also be used in the process of the invention, where these are available.

In accordance with the present process, an aldehyde of the presently useful structure is contacted with a bicyclic olefinic compound, wherein the olefinic carbon atoms carry only hydrogen as a substituent and a substituent, other than hydrogen, as further defined above, is present on at least one of the ethylene bridge carbon atoms.

The bicyclic ketones formed in accordance with the method of the invention have, as explained above, the plane formula

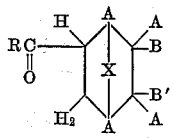

where R, X, A, B, and B' have the significance previously described. Compounds of this structure possess possibilities of steric, optical and position isomerism. All such forms of the new ketones are contemplated as coming within the scope of this invention. It is to be understood that the names used herein are to be interpreted in their generic sense, i.e., as representing the individual isomers in separated forms, as well as mixtures thereof, or the total unresolved mixture of isomers. In the present nomenclature, note is taken of position isomers, which may also be formed, in addition to steric and optical isomers, where the groups designated in the above formula as B and B' are different. While it has not as yet been possible to supply proof of this point, addition of the aldehyde to the double bond in the reaction which is the subject of this invention appears to take place in a random manner, as illustrated by the following equation:

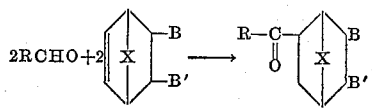

and

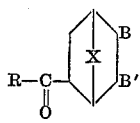

The products may thus be a mixture of position isomers; for example, on addition of butyraldehyde to 5-chlorobicyclo[2.2.1]-5-heptene, the alternative products are 5-chlorobicyclo[2.2.1]heptan-2-yl propyl ketone, and 6-chlorobicyclo[2.2.1]heptan-2-yl propyl ketone. The position isomers obtained may be generally illustrated by the structure:

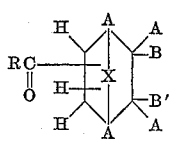

Specific reaction products are designated herein as, e.g., 5- and 6-phenylbicyclo[2.2.1]heptan-2-yl amyl ketone (from 5-phenylbicyclo[2.2.1]-2-heptene and caproaldehyde), methyl 5- and 6-propionylbicyclo[2.2.1]heptane-2-carboxylate (from methyl bicyclo[2.2.1]-5-heptene-2-carboxylate and propionaldehyde), etc. Where the substituents designated in the above formula as B and B' are the same in the initial bicyclic olefin, as in diisobutyl bicyclo[2.2.1]-5-heptene-2,3-dicarboxylate, it will be obvious that a single ketone will be the product of the present reaction.

Thus, by the reaction of the present aldehydes with bicyclic olefinic compounds as defined above in which the substituent on an ethylene bridge carbon atom is a hydrocarbon radical, there may be produced:

5- and 6-phenylbicyclo[2.2.1]heptan-2-yl methyl ketone,
5- and 6-phenylbicyclo[2.2.1]heptan-2-yl propyl ketone,
5- and 6-phenylbicyclo[2.2.1]heptan-2-yl butyl ketone,
5- and 6-phenylbicyclo[2.2.1]heptan-2-yl n-hexyl ketone,
5- and 6-phenyl-bicyclo[2.2.1]heptan-2-yl undecyl ketone,
5- and 6-phenylbicyclo[2.2.1]heptan-2-yl heptadecyl ketone,
5- and 6-p-tolylbicyclo[2.2.1]heptan-2-yl ethyl ketone,
5- and 6-m-tolylmicyclo[2.2.1]heptan-2-yl-eicosanyl ketone,
5- and 6-tolylbicyclo[2.2.1]heptan-2-yl sec-butyl ketone,
5- and 6-phenyl-7-oxabicyclo[2.2.1]heptan-2-yl-isopropyl ketone,
5- and 6-phenyl-7-oxabicyclo[2.2.1]heptan-2-yl decyl ketone,
5- and 6-tolyl-7-oxabicyclo[2.2.1]heptan-2-yl pentadecyl ketone,
5- and 6-phenylbicyclo[2.2.2]octan-2-yl propyl ketone,
5- and 6-phenylbicyclo[2.2.2]octan-2-yl undecyl ketone,
5- and 6-p-tolylbicyclo[2.2.2]octan-2-yl hexyl ketone,
1,7,7-trimethyl-5- and 6-phenylbicyclo[2.2.1]heptan-2-yl propyl ketone,
1,4-dimethyl-5- and 6-phenyl-7-oxabicyclo[2.2.1]heptan-2-yl hexyl ketone, etc.

When the present process is operated with the presently useful aldehydes and bicyclic olefins in which the two carbon atoms of an ethylene bridge are linked to a dicarboxylic acid anhydride radical, there are obtained, for example:

5-acetylbicyclo[2.2.1]heptane-2,3-dicarboxylic anhydride,
5-propionylbicyclo[2.2.1]heptane-2,3-dicarboxylic anhydride,
5 - butyrylbicyclo[2.2.1]heptane - 2,3 - dicarboxylic anhydride,
5 - enanthylbicyclo[2.2.1]heptane - 2,3 - dicarboxylic anhydride,
5 - heneicosanoylbicyclo[2.2.1]heptane - 2,3 - dicarboxylic anhydride,
5 - caprylbicyclo[2.2.1]heptane - 2,3 - dicarboxylic anhydride,
5 - lauroylbicyclo[2.2.1]heptane - 2,3 - dicarboxylic anhydride,
5 - palmitoylbicyclo[2.2.1]heptane - 2,3 - dicarboxylic anhydride,
5 - stearoylbicyclo[2.2.1]heptane - 2,3 - dicarboxylic anhydride,
5 - pivalylbicyclo[2.2.1]heptane - 2,3 - dicarboxylic anhydride,
5 - acetylbicyclo[2.2.2]octane - 2,3 - dicarboxylic anhydride,
5 - pelargonylbicyclo[2.2.2]octane - 2,3 - dicarboxylic anhydride,
5 - stearoylbicyclo[2.2.2]octane - 2,3 - dicarboxylic anhydride,
5 - propionyl - 7 - oxabicyclo[2.2.1]heptane - 2,3 - dicarboxylic anhydride,
5 - isovaleryl - 7 - oxabicyclo[2.2.1]heptane - 2,3 - dicarboxylic anhydride,
5 - caprylyl - 7 - oxabicyclo[2.2.1]heptane - 2,3 - dicarboxylic anhydride,
5 - myristoyl - 7 - oxabicyclo[2.2.1]heptane - 2,3 - dicarboxylic anhydride,
5 - acetyl - 1,4 - dimethyl - 7 -oxabicyclo[2.2.1]heptane-2,3-dicarboxylic anhydride,
5 - butyryl - 1,4 - dimethyl - 7 - oxabicyclo[2.2.1] heptane-2,3-dicarboxylic anhydride, 5 - enanthyl - 1 - methyl - 7 - oxabicyclo[2.2.1]heptane-2,3-dicarboxylic anhydride,
1,7,7 - trimethyl - 5 - pelargonylbicyclo[2.2.1]heptane-2,3-dicarboxylic anhydride,
1,7,7 - trimethyl - 5 - stearoylbicyclo[2.2.1]heptane-2,3-dicarboxylic anhydride,
1 - methyl - 5 - valerylbicyclo[2.2.1]heptane - 2,3-dicarboxylic anhydride,
1 - nonyl - 5 - valerylbicyclo[2.2.1]heptane - 2,3 - dicarboxylic anhydride,
5 - benzoylbicyclo[2.2.1]heptane - 2,3 - dicarboxylic anhydride,
5 - cumoylbicyclo[2.2.1]heptane - 2,3 - dicarboxylic anhydride,
5 - (2 - naphthoyl)bicyclo[2.2.1]heptane - 2,3 - dicarboxylic anhydride,
5 - p - toluylbicyclo[2.2.1]heptane - 2,3 - dicarboxylic anhydride,
5 - (phenylacetyl)bicyclo[2.2.1]heptane - 2,3 - dicarboxylic anhydride,
5 - (2,4 - xyloyl)bicyclo[2.2.1]heptane - 2,3 - dicarboxylic anhydride,
5 - (cyclohexylcarbonyl)bicyclo[2.2.1]heptane - 2,3 - dicarboxylic anhydride,
5 - (cyclohexylacetyl)bicyclo[2.2.1]heptane - 2,3 - dicarboxylic anhydride,
5 - benzoyl - 7 - oxabicyclo[2.2.1]heptane - 2,3 - dicarboxylic anhydride,
5 - m - toluyl - 1,4 - dimethyl - 7 - oxabicyclo[2.2.1]heptane - 2,3 - dicarboxylic anhydride,
1 - methyl - 5 - (3,5 - xyloyl) - 7 - oxabicyclo[2.2.1]heptane - 2,3 - dicarboxylic anhydride,
5 - (cyclohexylacetyl) - 7 - oxabicyclo[2.2.1]heptane-2,3 - dicarboxylic anhydride,
1,7,7 - trimethyl - 5 - m - toluylbicyclo[2.2.1]heptane-2,3-dicarboxylic anhydride,
1 - (2 - ethylhexyl) - 5 - benzoylbicyclo[2.2.1]heptane-2,3-dicarboxylic anhydride,
1,4 - diisobutyl - 5 - (1 - naphthoyl)bicyclo[2.2.1]heptane-2,3-dicarboxylic anhydride,
5 - benzoylbicyclo[2.2.2]octane - 2, 3 - dicarboxylic anhydride,
5 - p - toluylbicyclo[2.2.2]octane - 2,3 - dicarboxylic anhydride,
1,4 - di - n - propyl - 5 - isovalerylbicyclo[2.2.2]octane-2,3-dicarboxylic anhydride,
1,4 - diisobutyl - 5 - m - tolyuylbicyclo[2.2.2]octane-2,3-dicarboxylic anhydride,
1 - methyl - 4 - ethyl - 5 - benzoylbicyclo[2.2.2]octane-2,3-dicarboxylic anhydride.

Dicarboxylate ester derivatives of olefinic derivatives of olefinic bicyclic compounds may also be reached with aldehydes in accordance with the present process to give ketones of the general formula of the novel compounds provided by this invention. Such ketones are, for example:

dimethyl 5-acetylbicyclo[2.2.1]heptane-2,3-dicarboxylate,
di - n - propyl - 5 - isovalerylbicyclo[2.2.1]heptane - 2,3-dicarboxylate,
di - n - butyl 5 - enanthylbicyclo[2.2.1]heptane - 2,3-dicarboxylate
di - (2 - ethylhexyl) 5 - stearoylbicyclo[2.2.1]heptane-2,3-dicarboxylate,
diamyl 1 - methyl - 5 - myristoylbicyclo[2.2.1]heptane-2,3-dicarboxylate,
diethyl 1,4 - diisopropyl - 5 - (cyclohexylcarbonyl)bicyclo[2.2.1]heptane-2,3-dicarboxylate,
diethyl 1,7,7 - trimethyl - 5 - benzoylbicyclo[2.2.1]heptane-2,3-dicarboxylate,
diisopropyl 5 - (phenylacetyl)bicyclo[2.2.1]heptane - 2,3-dicarboxylate,
di - tert - butyl 1 - hexyl - 5 - m - toluylbicyclo[2.2.1]heptane - 2,3 - dicarboxylate,
diethyl 5 - butyryl - 7 - oxabicyclo[2.2.1]heptane - 2,3-dicarboxylate,
diethyl 5 - enanthyl - 7 - oxabicyclo[2.2.1]heptane - 2,3-dicarboxylate,
dibutyl 5 - lauroyl - 7 - oxabicyclo[2.2.1]heptane - 2,3-dicarboxylate,
diisopropyl 1,4 - dimethyl - 5 - stearoylbicyclo[2.2.1]heptane-2,3-dicarboxylate,
diethyl 5 - benzoylbicyclo[2.2.1]heptane - 2,3 - dicarboxylate,
diethyl 5 - cumoylbicyclo[2.2.1]heptane - 2, 3 - dicarboxylate,
dimethyl 5 - propionylbicyclo[2.2.2]octane - 2,3 - dicarboxylate,
diisopropyl 5 - caprylylbicyclo[2.2.2]octane - 2,3 - dicarboxylate,
diethyl 5 - myristoylbicyclo[2.2.2]octane - 2,3 - dicarboxylate,
dimethyl 1,4 - dimethyl - 5 - p - toluylbicyclo[2.2.2]octane-2,3-dicarboxylate, etc.

As examples of ketones which may be obtained from presently useful monocarboxylated bicyclic olefinic compounds and the esters thereof may be listed, e.g., 5- and 6-acetylbicyclo[2.2.1]heptane-2-carboxylic acid,
5- and 6-butyrylbicyclo[2.2.1]heptane-2-carboxylic acid,
n-butyl 5- and 6-lauroylbicyclo[2.2.1]heptane-2-carboxylate,
2-ethylhexyl 5- and 6-stearoylbicyclo[2.2.1]heptane-2-carboxylate,
ethyl 5- and 6-benzoyl-3-methylbicyclo[2.2.1]heptane-2-carboxylate,
isopropyl 5- and 6-enanthyl-1,3,4-trimethyl[2.2.1]heptane-2-carboxylate,
5- and 6-(cyclohexylacetyl)-1,7,7-trimethyl[2.2.1]heptane-2-carboxylic acid,
benzyl 5- and 6-benzoylbicyclo[2.2.1]heptane-2-carboxylate,
5- and 6 - propionyl - 7 - oxabicyclo[2.2.1]heptane-2-carboxylic acid,
3-methyl-5- and 6-myristoyl-7-oxabicyclo[2.2.1]heptane-2-carboxylic acid,
ethyl 5- and 6-capryl-7-oxabicyclo[2.2.1]heptane-2-carboxylate,
5- and 6-isobutyrylbicyclo[2.2.2]octane-2-carboxylic acid,
amyl 5- and 6-palmitoylbicyclo[2.2.2]octane-2-carboxylate,
5- and 6-enanthyl-1,3-dimethylbicyclo[2.2.1]heptane-2-carboxylic acid,
nonyl 5- and 6-butyryl-1,7,7-trimethylbicyclo[2.2.1]heptane-2-carboxylate,
isopropyl 5- and 6-caproyl-1,4-dimethyl-7-oxabicyclo[2.2.1]heptane-2-carboxylate,
2-ethylhexyl 3-methyl-1,4-dioctadecyl-5- and 6-stearoyl-7-oxabicyclo[2.2.1]heptane-2-carboxylate,
ethyl 1,4-dimethyl-5- and 6-myristoylbicyclo[2.2.2]octane-2-carboxylate, etc.

Typical ketones obtainable in accordance with this invention from the present aldehydes and bicyclic olefinic compounds of the above formula and derivable by the Diels-Alder synthesis from vinyl esters of fatty acids are:

5- and 6-acetoxybicyclo[2.2.1]heptan-2-yl methyl ketone,
5- and 6-acetoxybicyclo[2.2.1]heptan-2-yl butyl ketone,
5- and 6-butyroxybicyclo[2.2.1]heptan-2-yl n-hexyl ketone,
1,7,7-trimethyl-5- and 6-acetoxybicyclo[2.2.1]heptan-2-yl heptadecyl ketone,
5- and 6-acetoxy-7-oxabicyclo[2.2.1]heptan-2-yl propyl ketone,
5- and 6-propionoxy - 7 - oxabicyclo[2.2.1]heptan - 2 - yl phenyl ketone,
5- and 6-acetoxy-1,4-dimethyl-7-oxabicyclo[2.2.1]heptan-2-yl hexyl ketone,
5- and 6-acetoxybicyclo[2.2.2]octan-2-yl butyl ketone, 5- and 6-butyroxybicyclo[2.2.2]actan-2-yl decyl ketone,
5- and 6-acetoxy-1,4-dipropylbicyclo[2.2.2]octan-2-yl n-octyl ketone.

From ketonic bicyclic olefinic compounds and the present aldehydes, exemplary di- and triketonic bicyclic compounds which may be made by the present method include, e.g.:

5- and 6-butyrylbicyclo[2.2.1]heptan-2-yl phenyl ketone,
5- and 6-enanthylbicyclo[2.2.1]heptan-2-yl phenyl ketone,
1,7,7-trimethyl-5- and 6-stearoylbicyclo[2.2.1]heptan-2-yl methyl ketone,
5,6-dibenzoylbicyclo[2.2.1]heptan-2-yl octyl ketone,
5- and 6-lauroyl-7-oxabicyclo[2.2.1]heptan-2-yl phenyl ketone,
1,4-dimethyl-5- and 6-valeryl-7-oxabicyclo[2.2.1]heptan-2-yl methyl ketone,
5- and 6-acetylbicyclo[2.2.1]octan-2-yl p-toluyl ketone, etc.

Examples of the products of reaction of aldehydes and bicycloalkenecarbonitriles by the present method include:

5- and 6-acetylbicyclo[2.2.1]heptane-2-carbonitrile,
5- and 6-pelargonylbicyclo[2.2.1]heptane-2-carbonitrile,
5- and 6-lauroylbicyclo[2.2.1]heptane-2-carbonitrile,
5- and 6-hendecanoyl[2.2.1]heptane-2-carbonitrile,
1,7,7-trimethyl-5- and 6-stearoylbicyclo[2.2.1]heptane-2-carbonitrile,
5- and 6-butyryl-7-oxabicyclo[2.2.1]heptane-2-carbonitrile,
5- and 6-lauroyl-1,4-dipropyl-7-oxabicyclo[2.2.1]heptane-2-carbonitrile,
5- and 6-enanthylbicyclo[2.2.2]octane-2-carbonitrile,
5- and 6-palmitoylbicyclo[2.2.2]octane-2-carbonitrile,
5- and 6-butyryl-3-methylbicyclo[2.2.1]heptane-2-carbonitrile,
5- and 6-valeryl-3-methyl-7-oxabicyclo[2.2.1]heptane-2-carbonitrile,
5- and 6-caproyl-3-methylbicyclo[2.2.2]octane-2-carbonitrile, etc.

From bicycloalkene halides and aldehydes as defined above, there may be prepared by the method of the invention, for example, 5- and 6-chlorobicyclo[2.2.1]heptan-2-yl propyl ketone,
5- and 6-chlorobicyclo[2.2.1]heptan-2-yl amyl ketone,
5- and 6-chlorobicyclo[2.2.1]heptan-2-yl undecyl ketone,
5- and 5-bromobicyclo[2.2.1]heptan-2-yl hexadecyl ketone,
5- and 6-chloro-7-oxabicyclo[2.2.1]heptan-2-yl propyl ketone,
5- and 6-chloro-7-oxabicyclo[2.2.1]heptan-2-yl methyl ketone,
5- and 6-chloro-7-oxabicyclo[2.2.1]heptan-2-yl octyl ketone,
5- and 6-chloro-7-oxabicyclo[2.2.1]heptan-2-yl tridecyl ketone,
5- and 6-bromo-7-oxabicyclo[2.2.1]heptan-2-yl pentadecyl ketone,
5- and 6-chlorobicyclo[2.2.2]octan-2-yl isopropyl ketone,
5- and 6-chlorobicyclo[2.2.2]octan-2-yl nonyl ketone,
5- and 6 - chloro - 1,4 - dimethylbicyclo[2.2.1]heptan-2-yl propyl ketone,
5- and 6-bromo-1,7,7-trimethylbicyclo[2.2.1]heptan-2-yl isobutyl ketone,
5- and 6-chloro-1-(2-ethylhexyl)bicyclo[2.2.1]heptan-2-yl hexyl ketone,
5- and 6-chloro-1,4-dimethyl-7-oxabicyclo[2.2.1]heptan-2-yl isooctyl ketone,
5- and 6 - chloro - 1,4 - dimethylbicyclo[2.2.2]octan-2-yl propyl ketone,
5- and 6-(chloromethyl)bicyclo[2.2.1]heptan-2-yl n-hexyl ketone,
5- and 6-(chloromethyl)bicyclo[2.2.2]octan-2-yl ethyl ketone.

From nitrobicycloalkenes and aldehydes, there may be prepared, for example, 5- and 6-nitrobicyclo[2.2.1]heptan-2-yl methyl ketone,
5- and 6-nitrobicyclo[2.2.1]heptan-2-yl propyl ketone,
5-methyl-6-nitrobicyclo[2.2.1]heptan-2- and 3-yl propyl ketone,
5-nitro-6-propylbicyclo[2.2.1]heptan-2- and 3-yl hexyl ketone,
5-nitro-6-phenylbicyclo[2.2.1]heptan-2- and 3-yl pentadecyl ketone,
5-methyl-6-nitro-7-oxabicyclo[2.2.1]heptan-2- and 3-yl propyl ketone,
5- and 6-nitro-7-oxabicyclo[2.2.1]heptan-2-yl hexyl ketone,
5- and 6-nitrobicyclo[2.2.2]octan-2-yl propyl ketone,
1,4-dimethyl-5- and 6-nitrobicyclo[2.2.2]octan-2-yl cyclohexyl ketone,
5-nitro-6-propylbicyclo[2.2.1]heptan-2- and 3-yl p-tolyl ketone, etc.

As examples of reaction products of aldehydes and bicyclic ethers in accordance with the present invention may be mentioned:

5- and 6-ethoxybicyclo[2.2.1]heptan-2-yl propyl ketone,
5- and 6-butoxybicyclo[2.2.1]heptan-2-yl hexyl ketone,
5- and 6-ethoxybicyclo[2.2.1]heptan-2-yl heptadecyl ketone,
1,4-dimethyl-5- and 6-propoxybicyclo[2.2.1]heptan-2-yl butyl ketone,
5- and 6-p-tolylmercaptobicyclo[2.2.1]heptan-2-yl propyl ketone,
5- and 6-n-butoxybicyclo[2.2.2]octan-2-yl isobutyl ketone, etc.

Free-radical-liberating catalysts suitable for the process of the invention, i.e., the addition of an aldehyde to Diels-Alder adducts, include, for example, peroxygen-types, which may be organic, e.g., acyl peroxides such as diacetyl peroxide, dibenzoyl peroxide, or acetyl benzoyl peroxide, and alkyl peroxides such as tert-butyl hydroperoxide; or inorganic, such as hydrogen peroxide or per-salts, e.g., alkali persulfates, alkali perborates and alkali percarbonates. Other suitable free-radical-liberating agents useful as catalysts for the process of the invention are, e.g., hydrazine derivatives, such as hydrazine sulfate, hydrazine hydrochloride, or dibenzoylhydrazine; and organometallic compounds which decompose thermally to give free radicals, such as tetraethyl lead. Ultraviolet light is also a free-radical-producing agent which is suitable for use in the process of this invention. However, the organic peroxides are the presently preferred catalysts for this process.

The amounts of the aldehyde and bicyclic olefin reactants may be varied over a wide range. High molar ratios of aldehyde to bicyclic olefin may conveniently be employed, e.g., molar ratios of up to 20:1, to obtain maximum yields of the desired product. Where it is inconvenient or impractical to employ a large excess of aldehyde, the bicyclic compound may be added incrementally to the reaction mixture, thus in effect maintaining an excess of the aldehyde throughout the major portion of the reaction. If desired, an excess of bicyclic olefin could be used, though this is generally uneconomic. When a catalyst is used as the free radical source, as described above, the amount of catalyst added is not critical, from 0.5 to 15 mol percent, calculated on the bicyclic component, being generally satisfactory. Additional amounts of catalyst may be added during the course of the reaction, to ensure the reaction being driven as far towards completeness as possible. The temperature of the reaction may vary over a wide range, depending on the reactants and particularly on the catalyst used, which must be decomposed under the reaction conditions to produce free radicals. Frequently, it may be convenient to reflux the reactants at the boiling point of the mixture. A solvent may advantageously be employed in many cases; as examples of presently useful diluents may be mentioned benzene, xylene, hexane, trichlorobenzene, etc. Superatmospheric pressures, e.g., up to 2000 pounds per square inch, may be employed where desired, particularly with volatile reaction components, though usually the reaction goes satisfactorily at atmospheric pressure. The length of time the reaction is allowed to proceed depends, naturally, on such factors as the temperatures, pressures, and catalysts used, as well as the reactivity of the aldehyde and bicyclic olefin; generally, times of from 1 to 50 hours are satisfactory, but the time may be extended as necessary to produce desirable yields. The ketonic reaction products may be isolated from the reaction mixture, for example, by removal of unreacted starting materials and subsequent extraction and crystallization, or by fractional distillation.

The present novel ketones are useful for a variety of chemical and agricultural applications. The keto dicarboxylic anhydride compounds may be used, e.g., as components in the preparation of condensation resins. The novel keto esters of our invention prepared from a long-chain aldehyde may be used as plasticizers. The present compounds are also useful biological toxicants, and produce bactericidal, nematocidal, and plant defoliating effects.

The invention is further illustrated, but not limited, by the following examples:

PREPARATION OF DIELS-ALDER ADDUCTS

*Example 1.—Preparation of the adduct of cyclopentadiene and maleic anhydride*

A 2-liter flask fitted with stirrer, dropping funnel, reflux condenser, and thermometer was charged with 143 g. of maleic anhydride and 715 g. of benzene. To this was added, over a period of 30 min., 96.5 g. of cyclopentadiene in 100 g. of benzene. The temperature during the reaction was kept below 50° C. After addition of the cyclopentadiene was complete, the stirrer was stopped and the solution allowed to stand overnight. Upon cooling of the reaction mixture in an ice-bath, crystals separated and were removed by filtration. Concentration of the filtrate to one-half its volume gave a second crop of crystals. After recrystallization from benzene-hexane and drying in a desiccator, there was obtained a total yield of 144.6 g. (88% theor.) of bicyclo[2.2.1]-5-heptene-2,3-dicarboxylic anhydride, M. 161–163° C.

*Example 2.—Preparation of the adduct of furan and maleic anhydride*

Redistilled furan (204 g.; 3.0 moles) and 294 g. (3.0 moles) of maleic anhydride were mixed with gentle stirring for about one hour in 500 ml. of ether. After standing overnight, the reaction mixture was filtered; the filter cake was washed with 200 ml. of benzene and then freed of benzene under reduced pressure, giving a yield of 404.5 g. (81% theor.) of 7-oxabicyclo[2.2.1]-5-heptene-2,3-dicarboxylic anhydride, M. 121.5–122° C.

*Example 3.—Preparation of the adduct of cyclopentadiene and acrylonitrile*

To a flask charged with 212.2 g. (4.0 moles) of acrylonitrile at 40° C., were gradually added, with stirring, over a period of an hour and a half, 264.2 g. (4.0 moles) of freshly distilled cyclopentadiene. After the addition was completed, stirring of the mixture was continued for a further 2½ hours and then the reaction product was distilled, bicyclo[2.2.1]-5-heptene-2-carbonitrile being separated as the fraction boiling at 82–90° C./11–13 mm., which weighed 407.7 g., a yield of 85.6%.

*Example 4.—Preparation of the adduct of cyclopentadiene and styrene*

To a flask containing 620.5 g. (5.0 moles) of styrene and 1.0 g. of hydroquinone at 95–105° C. was intermittently added, over a 3-hour period, 203 g. (3.07 moles) of cyclopentadiene. The mixture was then stirred at about 100° C. for 3½ hours and then at 148–170° C. for an additional 7 hours. The fraction of the reaction product boiling at 85–90° C./1.5–2.0 mm. was purified by washing with 5% sodium hydroxide and water, followed by addition of benzene and distillation, which yielded 227.4 g. of 5-phenylbicyclo[2.2.1]-2-heptene, B. 108–110° C./7 mm., $n_D^{25}$ 1.5533.

*Example 5.—Preparation of the adduct of cyclopentadiene and vinyl chloride*

A mixture of 203 g. of vinyl chloride and 200 g. of cyclopentadiene was placed in a 1-liter rocking bomb, which was then heated to 175° C. (1500 p.s.i.) and rocked for 14 hours. The bomb was cooled and the contents distilled; the portion boiling up to 125°/10 mm. being redistilled to recover 150 g. of 5-chlorobicyclo[2.2.1]-2-heptene, B. 48–50° C./14 mm., $n_D^{25}$ 1.4929.

ESTERIFICATION OF DIELS-ALDER ADDUCTS

*Example 6.—Preparation of dibutyl bicyclo[2.2.1]-5-heptene-2,3-dicarboxylate*

To a 500 ml. flask topped by a Dean-Stark trap and reflux condenser, were charged 82.1 g. (0.5 mole) of the product of Example 1, 200 ml. of n-butanol, 0.5 g. of p-toluenesulfonic acid (monohydrate), and 50 ml. of benzene. The reactants were refluxed for 7½ hours. Ten ml. of water collected in the Dean-Stark trap.

The reaction mixture was evaporated on a steam bath and the residue dissolved in ether. The ether solution was washed with water, dilute sodium bicarbonate solution, and then water again, after which it was filtered through anyhydrous sodium sulfate and the ether stripped off under reduced pressure on a steam bath. On distillation of the residue, there were obtained 122.4 g. (83.2% theor.) of dibutyl bicyclo[2.2.1]-5-heptene-2,3-dicarboxylate, B. 177–178° C./8 mm., $n_D^{25}$ 1.4688.

*Example 7.—Preparation of dimethyl 7-oxabicyclo[2.2.1]-5-heptene-2,3-dicarboxylate*

A mixture of 100 g. of the product of Example 2, 625 ml. of anhydrous methanol, and 4 ml. of concentrated $H_2SO_4$ was refluxed for 6 hours, the methanol solution was then cooled on an ice-bath, whereupon crystals separated. The crystals were filtered off and the filtrate concentrated to about one-third its volume, after which cooling in an ice-bath gave an additional crop of crystals. The combined crystals represented 80.2 g. of the desired di-ester product, M. 118–119° C.

ADDITION OF ALDEHYDES TO BICYCLIC OLEFINS

*Example 8.—Addition of butyraldehyde to bicyclo[2.2.1]-5-heptene-2,3-dicarboxylic anhydride*

A solution of 32.8 g. (0.2 mole) of the product of Example 1 in 144.2 g. (2.0 mole) of butyraldehyde was charged to a flask; 100 ml. of hexane, 100 ml. of benzene, and 0.5 g. of benzoyl peroxide were added, and the solution was brought to reflux under a Dean-Stark trap. After six hours, an additional 0.5 g. of benzoyl peroxide was added, and after another 16½ hours, a further 0.5 g. of benzoyl peroxide was added, while refluxing was continued until a total of 30½ hours had elapsed. The reaction mixture was then distilled to a pot temperature of 160° C./3 mm., leaving a residue of 44.3 g. of viscous material. The latter was triturated with hexane to form a solid, which was then separated and triturated with boiling hexane. After air-drying, a yield of 37.3 g. of crude 5 - butyrylbicyclo[2.2.1]heptane - 2,3 - dicarboxylic anhydride, M. 65–75° C., was obtained. Two recrystallizations of a portion of this material from ether-hexane gave a solid melting at 86–87° C. which had the following analysis:

|  | Calcd. for $C_{13}H_{16}O_4$ | Found |
|---|---|---|
| Percent C | 66.1 | 66.46 |
| Percent H | 6.82 | 6.89 |

Additional ketone was obtained by concentration of the filtrate from recrystallization.

Applied to the foliage of bean plants (Black Valentine, having one mature trifoliate) at a rate of 9 lbs./acre, 5-butyrylbicyclo[2.2.1]heptane-2,3-dicarboxylic anhydride produced 90% defoliation of the plants within 10 days. This compound and other of the novel ketones of the invention may be used, e.g., to produce leaf abscission of commercial crop plants, such as cotton, beans, peas, etc., so as to reduce or prevent infestation of the plants during the growing season by agricultural pests such as leafworm, and also to facilitate the harvesting of the bolls, pods, etc.

*Example 9.—Addition of butyraldehyde to 7-oxabicyclo-[2.2.1]-5-heptene-2,3-dicarboxylic anhydride*

A mixture of 16.6 g. (0.1 mole) of the product of Example 2, 72.1 g. (1.0 mole) of butyraldehyde, 100 ml. of hexane and 200 ml. of benzene was refluxed with stirring in the presence of benzoyl peroxide for a total of 25.5 hours. The product 5-butyryl-7-oxabicyclo[2.2.1]heptane-2,3-dicarboxylic anhydride was isolated by filtration, extraction with ether, and recrystallization from hexane.

*Example 10.—Addition of enanthaldehyde to bicyclo-[2.2.1]-5-heptene-2-carbonitrile*

A mixture of 75.0 g. (0.63 mole) of the product of Example 3, 93.8 g. (0.82 mole) of enanthaldehyde, and 1.0 g. of benzoyl peroxide was heated to the reflux temperature of benzene in a jacketed reactor; an additional gram of benzoyl peroxide was added at intervals, in 0.5 g. increments, during a period of 45 hours, after which the mixture was distilled. The 5- and 6-enanthylbicyclo-[2.2.1]heptane-2-carbonitrile collected at 142–152° C./0.4–0.9 mm. ($n_D^{25}$ 1.4722) had the following elementary analysis:

|  | Found | Calcd. for $C_{15}H_{23}NO$ |
|---|---|---|
| Percent C | 77.09 | 77.3 |
| Percent H | 10.46 | 9.94 |

The recrystallized, dried 2,4-dinitrophenylhydrazone derivative of a portion of the sample melted at 127–128° C.

*Example 11.—Addition of butyraldehyde to 5-phenyl-bicyclo[2.2.1]-2-heptene*

A mixture of 81.1 g. (0.5 mole) of the product of Example 4 and 108.1 g. (1.5 mole) of butyraldehyde was refluxed in the presence of benzoyl peroxide at 80–85° C. The reaction mixture was then evaporated on a steam bath at 95° C. for an hour, after which the residual material was dissolved in benzene and the benzene solution washed first with sodium carbonate solution, and then with water. After removal of the benzene by evaporation on a steam bath, the residue was distilled, the product being collected as the fraction boiling at 124–134° C./0.3 mm., $n_D^{25}$ 1.5323. The 5- and 6-phenylbicyclo[2.2.1]- heptan-2-yl propyl ketone had the following elementary analysis:

|  | Found | Calcd. for $C_{17}H_{22}O$ |
|---|---|---|
| Percent C | 83.85 | 84.1 |
| Percent H | 9.37 | 9.13 |

*Example 12.—Addition of butyraldehyde to 5-chlorobi-cyclo[2.2.1]-2-heptene*

A mixture of 64.3 g. (0.5 mole) of the product of Example 5 and 108.1 g. (1.5 mole) of butyraldhyde was refluxed in the presence of benzoyl peroxide and the product isolated as described in Example 11. The 5- and 6-chlorobicyclo[2.2.1]heptan-2-yl propyl ketone obtained, B.P. 81–87° C./0.3 mm., $n_D^{25}$ 1.4855, had the following elementary analysis:

|  | Found | Calcd. for $C_{11}H_{17}ClO$ |
|---|---|---|
| Percent C | 64.88 | 65.99 |
| Percent H | 8.42 | 8.54 |

*Eaxmple 13.—Addition of butyraldehyde to di-n-butyl bicyclo[2.2.1]-5-heptene-2,3-dicarboxylate*

A mixture of 58.9 g. (0.2 mole) of the product of Example 6 and 72.1 g. (1.0 mole) of butyraldehyde was refluxed in the presence of benzoyl peroxide and the product isolated as described in Example 11. There was obtained 47.4 g. (64.6% theor. yield) of di-n-butyl 5-butyrylbicyclo[2.2.1]heptane-2,3-dicarboxylate, $n_D^{25}$ 1.4684, B. 186–190° C./9.1.1 mm., which had the following analysis:

|  | Found | Calcd. for $C_{21}H_{34}O_5$ |
|---|---|---|
| Percent C | 69.09 | 68.8 |
| Percent H | 9.36 | 9.35 |

The di-n-butyl 5-butyrylbicycle[2.2.1]heptane-2,3-dicarboxylate prepared as described above has a high contact toxicity to *Oncopeltus fasciatus* (fifth instar nymphs). It is also toxic to nematodes such as *Panagrellus redivivis*.

*Example 14.—Addition of butyraldehyde to dimethyl 7-oxabicyclo-[2.2.1]-5-heptene-2,3-dicarboxylate*

A mixture of 21.2 g. of the product of Example 7 (0.1 mole) and 144.2 g. (2.0 mole) of butyraldehyde was refluxed in the presence of benzoyl peroxide for 42 hours. After removal of the excess butyraldehyde, the residue was filtered and the filter cake extracted with 300 cc. of methanol. Filtration and concentration of the methanol filtrate gave 4.0 g. of dimethyl 5-butyryl-7-oxabicyclo-[2.2.1]-heptane - 2,3 - dicarboxylate, M. 111–114° C., which, after recrystallization from methanol, had the following analysis:

|  | Found | Calcd. for $C_{14}H_{20}O_6$ |
|---|---|---|
| Percent C | 59.05 | 59.01 |
| Percent H | 7.27 | 7.04 |

Additional ketone was obtained by concentration of the methanol filtrate. This ketone is an active systemic insecticide.

Operating as in the above example, other presently useful aldehydes, e.g., benzaldehyde, cyclohexanecarboxaldehyde or lauraldehyde, may be similarly reacted with other bicyclic olefinic compounds of the above formula, e.g., 1,4 - dimethylbicyclo[2.2.1]-5-heptene-2-carboxylic acid, 1,7,7 - trimethyl - 2 - nitro-3-propyl-7-oxabicyclo[2.2.1]-5-heptene, bicyclo[2.2.2]-5-octen-2-yl acetate, etc., to give the novel ketones of the invention. Also, instead of benzoyl peroxide, other free-radical-liberating agents may be used to catalyze the reaction.

While the present invention has been described with particular reference to individual compounds in detailed procedures, it is to be understood that other modifications and variations may be used without departure from the scope of the invention.

What is claimed is:

1. Di-n-butyl 5-butyrylbicyclo[2.2.1]heptane-2,3-dicarboxylate.

2. Ketones of the formula

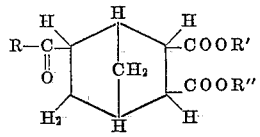

wherein R is an alkyl radical having from 1 to 20 carbon atoms and R' and R" are alkyl radicals having less than 11 carbon atoms.

References Cited in the file of this patent

UNITED STATES PATENTS

| | | |
|---|---|---|
| 2,144,455 | Gubelmann | Jan. 17, 1939 |
| 2,407,508 | Morris et al. | Sept. 10, 1946 |
| 2,471,790 | Sowa | May 31, 1949 |
| 2,576,080 | Tischler | Nov. 20, 1951 |
| 2,773,799 | Hsing | Dec. 11, 1956 |

FOREIGN PATENTS

| | | |
|---|---|---|
| 582,721 | Great Britain | Nov. 26, 1946 |

OTHER REFERENCES

Beilstein: Vol 7, p. 116, second suppl. (1948).

Arundale et al.: Chemical Reviews, vol. 51, pp. 544–46 (1952) (Complete article 505–555).

Elsevier's Encyclopedia of Organic Chemistry, vol. 12A, p. 711 (1948).

UNITED STATES PATENT OFFICE
CERTIFICATE OF CORRECTION

Patent No. 2,957,906

October 25, 1960

Floyd B. Erickson et al.

It is hereby certified that error appears in the above numbered patent requiring correction and that the said Letters Patent should read as corrected below.

Column 1, about line 23, insert -- RCHO+ --, before the first structural formula; line 60, for "capryaldehyde" read -- caprylaldehyde --; column 3, line 18, for "dimethyl" read -- diethyl --; column 6, line 16, for "6-m-tolylmicyclo" read -- 6-m-tolylbicyclo --; line 18, for "6-tolylbicyclo" read -- 6-o-tolylbicyclo --; column 7, line 53, for "reached" read -- reacted --; column 14, line 30, for "Eaxmple", in italics, read -- Example --; in italics; line 38, for "9.1.1" read -- 0.9-1.1 --.

Signed and sealed this 1st day of October 1963.

(SEAL)
Attest:
ERNEST W. SWIDER
Attesting Officer

DAVID L. LADD
Commissioner of Patents